2,809,955
Patented Oct. 15, 1957

2,809,955

STABILIZING ALKENYL AROMATIC RESINS AGAINST WEATHERING

Lorne A. Matheson, Boulder, Colo., and Raymond F. Boyer, Midland, Mich., assignors to The Dow Chemical Company, Midland, Mich., a corporation of Delaware No Drawing. Application January 27, 1954, Serial No. 406,574

4 Claims. (Cl. 260—45.9)

This invention concerns a method and agent for stabilizing the resinous polymers of alkenyl aromatic compounds against the detrimental effects of weathering upon exposure to atmospheric conditions over long periods of time.

U. S. Patent No. 2,287,188, describes a method and class of amines for retarding or preventing discoloration by light of polystyrene and other vinyl aromatic resins with which they are incorporated. The patent teaches that this stabilizing action is not common to all amines and that many amino compounds have the opposite property of promoting the discoloration by light of vinyl aromatic resins with which they are incorporated. The amines taught to be effective are those having normal boiling points above 200° C. and ionization constants greater than $10^{-9}$.

The advantages of preventing or retarding the tendency to undergo gradual discoloration upon exposure to light of vinyl aromatic resins are obvious since curtailment of this property enhances utility of the resins for many purposes. However, change in other of the properties of the resins such as impairment of one or more of the mechanical properties, e. g. tensile strength, impact strength, or percent elongation, upon weathering, which the reins normally undergo upon exposure to atmospheric conditions over long periods of time, detracts from utility of the resins for many purposes to which they are otherwise well suited.

As stated in the aforementioned patent, the stabilizing action of amino compounds to prevent or retard discoloration by light of polystyrene and other vinyl aromatic resins with which they are incorporated is not common to all amines. It has been observed that the effectiveness of an amine in curtailing discoloration of vinyl aromatic resins by light varies with change in the quality, i. e. the relative intensities of different wave lengths, of the light and that most of the aforementioned amines are far more effective in preventing discoloration of the resins by artificial light than by unfiltered sunlight. It has further been observed that most amines not only fail to provide adequate protection against discoloration by sunlight of vinyl aromatic resins with which they are incorporated, but also fail to prevent substantial impairment of one or more of the mechanical properties such as tensile strength, impact strength, or percent elongation, upon exposure to out-of-doors weathering over long periods of time of resins with which they are incorporated.

It has now been found that tetramethyldiamino-2-propanol, $(CH_3)_2N \cdot CH_2CH(OH)CH_2 \cdot N(CH_3)_2$, is an effective agent for retarding or preventing impairment of one or more of the mechanical properties tensile strength, impact strength, or percent elongation, upon weathering of alkenyl aromatic resins with which it is incorporated. It has further been found that the tetramethyldiamino-2-propanol not only curtails or prevents impairment of the mechanical properties of the resin upon weathering for long periods of time, but also retards or suppresses the tendency to undergo discoloration upon exposure to outdoor light of the resin with which it is incorporated. This pronounced stabilizing action of tetramethyldiamino-2-propanol for both retarding or preventing impairment of the mechanical properties and curtailment of discoloration upon weathering of an alkenyl aromatic resin with which it is incorporated appears to be, peculiarly, specific to the compound tetramethyldiamino-2-propanol having the formula $$(H_3C)_2N \cdot CH_2 \cdot CHOH \cdot CH_2 \cdot N(CH_3)_2$$

Such strong stabilizing action is not common to all amines and is in most, if not all, instances not shared by amines of quite similar but different molecular structure, e. g. tetraethyldiamino-2-propanol.

The tetramethyldiamino-2-propanol is usually employed in amount corresponding to from 0.05 to 5, preferably from 0.1 to 2, percent by weight of the alkenyl aromatic resin.

As the alkenyl aromatic resin, there may be employed homopolymers and copolymers of one or more monovinyl aromatic hydrocarbons of the benzene series such as styrene, ortho-, meta-, or para-vinyltoluene, vinylxylene, ethylvinylbenzene, or ethylvinyltoluene, or copolymers of at least one such monovinyl aromatic hydrocarbon and 30 percent by weight or less of a monoalkenyl aromatic hydrocarbon such as alpha-methylstyrene, para-methyl-alpha-methylstyrene, or alpha-ethylstyrene.

The term "alkenyl aromatic resin" employed herein, refers to the thermoplastic solid homopolymers and copolymers of one or more monovinyl aromatic hydrocarbons of the benzene series and copolymers of at least 70 percent by weight of one or more monovinyl aromatic hydrocarbons with not more than 30 percent of an alpha-alkylvinyl aromatic hydrocarbon such as alpha-methyl styrene. The polymers have a molecular weight of 20,000 or greater, preferably a molecular weight of from 40,000 to 500,000, as determined by the well known Staudinger viscosity method.

The tetramethyldiamino-2-propanol stabilizing agent can be incorporated with the alkenyl aromatic resin in any of several ways. It may be added to the monomeric starting material before polymerization and the polymerization be carried out in its presence. The stabilizing agent may be dissolved in a solvent such as methanol, ethanol, or acetone, and the solution mixed with the alkenyl aromatic resin in granular form, or the resin and the tetramethyldiamino-2-propanol may be dissolved in a mutual solvent and the latter thereafter be evaporated. The liquid tetramethyldiamino-2-propanol may be added to the alkenyl aromatic resin in granular form and the mixture blended, e. g. by tumbling, to uniformly distribute the stabilizing agent over surfaces of the resin granules. Subsequent molding of the composition in usual ways such as by compression, injection, or extrusion molding operations is usually satisfactory to uniformly distribute the stabilizing agent throughout the mass.

In an alternate procedure, the thermoplastic alkenyl aromatic resin can be heat-plastified and mechanically worked on compounding rolls, or in a Banbury mixer, or plastics extruder, and the tetramethyldiamino-2-propanol added in the desired proportion. The heated mixture is mechanically worked for a time sufficient to uniformly distribute the stabilizing agent throughout the mass, after which it is cooled and cut or broken to a granular form suitable for molding.

A small amount of one or more lubricants or flow agents having a boiling point above 200° C. at atmospheric pressure, such as butyl stearate, white mineral oil, soy bean oil, or ethyl laurate, may be added to the resin or composition in amount corresponding to from 1 to 5 percent by weight of the resin prior to, during, or subsequent to, addition of the tetramethyldiamino-2-propanol. Other usual additives such as fillers, plasticizers, dyes, or pigments may also be incorporated in the compositions, but none of the additives just mentioned is required.

In a preferred practice, the tetramethyldiamino-2-propanol is fed into admixture with a stream of the heat-plastified, or molten, alkenyl aromatic resin in a plastics extruder, in the desired proportion, wherein the ingredients are mechanically worked in admixture with one another in the substantial absence of air or oxygen for a time sufficient to uniformly distribute the stabilizing agent throughout the mass with resultant formation of a homogeneous composition. Thereafter, the composition is discharged from the extruder and is cooled and cut or ground to a granular form suitable for molding.

The following examples illustrate ways in which the principle of the invention has been applied but are not to be construed as limiting its scope.

EXAMPLE 1

A mixture of 995 grams of granular molding grade polystyrene containing one percent by weight of white mineral oil as lubricant and 5 grams of tetramethyldiamino-2-propanol as stabilizing agent was placed in a glass bottle. The mixture was blended by tumbling for 10 minutes to distribute the stabilizing agent over surfaces of the polymer granules. The mixture was fed to a laboratory extruder having a 1-inch diameter screw wherein it was heated at temperatures of from 115° F. up to 450° F. and extruded through an outlet, then cooled and crushed to a granular form. Portions of the composition were injection molded to form test pieces of 1/8 x 1/2 inch cross section by 4 inches long. The test pieces were used to determine the percent yellowness, the tensile strength, impact strength and percent elongation for the polymer on test pieces as initially molded, and on test pieces after exposure to outdoor weathering in Florida for a period of six months. The percent yellowness, or color in the polymer, was determined by measuring the percent of light transmitted through a test piece of the composition at wave lengths of 620 millimicrons and 420 millimicrons, respectively, and calculating the percent yellowness or color in accordance with the equation $$\text{Percent color} = 100\frac{x-y}{x}$$

wherein $x$ is the percent of transmitted light having a wave length of 620 millimicrons and $y$ is the percent of transmitted light having a wave length of 420 millimicrons. The procedure employed for determining tensile strength and percent elongation was similar to that described in ASTM D638-49T. The procedure for determining impact strength was similar to that described in ASTM D256-43T. For purpose of comparison molded test pieces of the unstabilized polystyrene were prepared and tested as just described. Table I gives the properties of the unstabilized and the stabilized polystyrene both before and after exposure to outdoor weathering in Florida for a period of six months.

*Table I*

| Property of Polymer | Unstabilized Polystyrene | | Stabilized Polystyrene | |
| --- | --- | --- | --- | --- |
| | Before Weathering | After Weathering | Before Weathering | After Weathering |
| Percent color | 4.4 | 52.6 | 8.5 | 16.4 |
| Tensile strength, lbs./sq. in. | 7,200 | 5,260 | 6,570 | 6,710 |
| Percent elongation | 2.3 | 1.6 | 2.2 | 2.1 |
| Notched impact strength, ft.-lbs. | 0.66 | 0.41 | 0.74 | 0.70 |

EXAMPLE 2

A molding grade polystyrene was mixed with one percent by weight of tetramethyldiamino-2-propanol as stabilizing agent by feeding the latter into admixture with a stream of molten polystyrene in a plastics extruder wherein the ingredients were heated at temperatures between 350° and 450° F. and uniformly mixed with one another, then discharged through an outlet, cooled and cut to a granular form. A portion of the stabilized polystyrene was injection molded to form test pieces of 1/8 x 1/2 inch cross section. The test pieces were used to determine the percent color and mechanical properties for the polystyrene employing procedures similar to those described in Example 1. The percent color and mechanical properties were determined on test pieces as initially molded and on test pieces after exposure to weathering in Florida for a period of six months. For purpose of comparison, test pieces of the unstabilized polystyrene were prepared and tested in similar manner. Table II gives the properties for the unstabilized and the stabilized polystyrene both before and after exposure of molded test pieces to outdoor weathering in Florida for a period of six months.

*Table II*

| Property of Polymer | Unstabilized Polystyrene | | Stabilized Polystyrene | |
| --- | --- | --- | --- | --- |
| | Before Weathering | After Weathering | Before Weathering | After Weathering |
| Percent color | 3.0 | 45.2 | 5.2 | 8.6 |
| Tensile strength, lbs./sq. in. | 6,250 | 5,300 | 6,270 | 6,680 |
| Percent elongation | 2.8 | 1.5 | 2.6 | 1.9 |
| Notched impact strength, ft.-lbs. | 0.65 | 0.44 | 0.55 | 0.55 |

EXAMPLE 3

A mixture of 98 percent by weight of pure styrene and 2 percent of tetramethyldiamino-2-propanol was polymerized by heating the same in a sealed glass bottle at a temperature of 125° C. for a period of 7 days, then at 150° C. for 2 days. The polymer was cooled, removed from the bottle and crushed to a granular form. A portion of the polymer was compression molded at a temperature of 160° C. into test plates having the dimensions 1.75 x 2.5 inches by 0.1 inch thick. The plates were exposed to outdoor weathering in the northern part of the United States and observed from time-to-time over a period of approximately 9 years. In carrying out the weathering tests a plate of the stabilized polystyrene was placed near a plate of unstabilized polystyrene, prepared under similar polymerization and molding conditions, so that the two plates would be exposed to the same weathering conditions. After exposure to weathering for a period of approximately 9 years, the test plate of the polystyrene containing 2 percent by weight of tetramethyldiamino-2-propanol as stabilizing agent was transparent, had a light yellow color, a smooth surface and was free from cracks. In contrast, the test plate of unstabilized polystyrene was opaque and had a dark brown color and a rough eroded surface.

We claim:

1. A molding composition comprising a substantially homogeneous mixture of polystyrene and, as an agent for stabilizing the same against discoloration and impairment of its mechanical properties by out-of-door weathering, from 0.05 to 5 percent by weight of tetramethyldiamino-2-propanol.

2. Polystyrene stabilized against discoloration and impairment of its mechanical properties by out-of-door weathering with from 0.05 to 5 percent by weight of tetramethyldiamino-2-propanol.

3. A molding composition comprising a substantially homogeneous mixture of polystyrene and, as an agent for stabilizing the same against discoloration and impairment of its mechanical properties by out-of-door weathering, from 0.1 to 2 percent by weight of tetramethyldiamino-2-propanol.

4. Polystyrene stabilized against discoloration and impairment of its mechanical properties by out-of-door weathering with from 0.1 to 2 percent by weight of tetramethyldiamino-2-propanol.

References Cited in the file of this patent

UNITED STATES PATENTS 2,681,328    Stanton et al. ---------- June 15, 1954